(12) United States Patent
Nelson (10) Patent No.: US 9,975,711 B2
(45) Date of Patent: May 22, 2018

(54) BIN SWEEP AND MOTOR COUPLING ASSEMBLY

(71) Applicant: Chris Nelson, Harrisburg, SD (US)

(72) Inventor: Chris Nelson, Harrisburg, SD (US)

(*) Notice: Subject to any disclaimer, the term of this patent is extended or adjusted under 35 U.S.C. 154(b) by 42 days.

(21) Appl. No.: 14/737,110

(22) Filed: Jun. 11, 2015

(65) Prior Publication Data
US 2017/0313526 A1    Nov. 2, 2017

(51) Int. Cl.
*B65G 33/34* (2006.01)
*B65G 65/40* (2006.01)
*F16H 7/06* (2006.01)
*F16H 57/035* (2012.01)

(52) U.S. Cl.
CPC .............. *B65G 65/40* (2013.01); *F16H 7/06* (2013.01); *F16H 57/035* (2013.01); *B65G 33/34* (2013.01)

(58) Field of Classification Search
CPC ...... B65G 65/30; B65G 65/466; B65G 65/46; B65G 33/14; B65G 65/34; B65G 53/48; B65G 65/40; B65G 33/34; B65G 33/36; F16H 7/06
USPC ......... 198/657, 674, 675; 414/301, 302, 310
See application file for complete search history.

(56) References Cited

U.S. PATENT DOCUMENTS

| | | | |
|---|---|---|---|
| 2,927,682 A * | 3/1960 | Dorris ................ | B65G 33/34 198/674 |
| 3,117,681 A * | 1/1964 | Seymour ............ | A01K 5/0258 198/674 |
| 3,151,749 A * | 10/1964 | Long .................. | B65G 65/466 198/657 |
| 3,229,828 A * | 1/1966 | Kucera ............... | A01F 25/2009 198/587 |
| 3,368,703 A * | 2/1968 | Lusk .................. | A01F 25/2009 198/625 |
| 3,456,818 A * | 7/1969 | Massey .............. | B65G 65/466 198/666 |
| 4,029,219 A * | 6/1977 | Rutten ................ | B65G 65/466 414/308 |
| 4,033,466 A * | 7/1977 | Easton ............... | B65G 69/0433 414/301 |
| 4,445,814 A * | 5/1984 | Malmstrom ....... | B65G 69/0433 198/508 |
| 8,042,680 B2 * | 10/2011 | Pottmann ............ | F16D 1/116 198/674 |

* cited by examiner

Primary Examiner — James R Bidwell (57) ABSTRACT

A drive coupling assembly includes a housing having a first wall, a second wall, a first end and a second end. A first aperture extends through the second wall adjacent to the first end and a second aperture extending through the second wall adjacent to the second end. The first aperture receives a motor drive shaft and the second aperture receives a sweep drive shaft. Each of the first and second apertures has one of a pair of sprocket hubs aligned therewith. A pair of drive hubs each has an opening extending therethrough and each opening engages one of the motor or sweep drive shafts. The drive hubs have a plurality of pins thereon extending into corresponding slots in the sprocket hubs. A continuous belt engages the sprocket hubs. The slots each have a length allowing limited rotation of the sprocket hubs with respect to the drive hubs.

19 Claims, 11 Drawing Sheets

BIN SWEEP AND MOTOR COUPLING ASSEMBLY

BACKGROUND OF THE DISCLOSURE

Field of the Disclosure

The disclosure relates to drive shaft engagement devices and more particularly pertains to a new drive shaft engagement device for engaging a drive shaft of a motor with a drive shaft of a bin sweep.

SUMMARY OF THE DISCLOSURE

An embodiment of the disclosure meets the needs presented above by generally comprising a housing having a first wall, a second wall and a perimeter wall attached to and extending between the first and second walls to define an interior space bounded by the first, second and perimeter walls. The housing has a first end, a second end, a first lateral side and a second lateral side. The housing has a first aperture therein extending through the first and second walls adjacent to the first end and a second aperture therein extending through the first and second walls adjacent to the second end. The first aperture is configured for receiving a motor drive shaft and the second aperture is configured for receiving a sweep drive shaft. A pair of sprocket hubs each is rotatably mounted in the housing. One of the sprocket hubs is aligned with the first aperture and another one of the sprocket hubs is aligned the second aperture. Each of the sprocket hubs includes an outer face facing away from the second wall, wherein the second wall faces a bin sweep when the housing is engaged with the sweep drive shaft. The outer face of each of the sprocket hubs includes a plurality of slots therein. Each of the slots is arcuate along a circle extending around a centrally located hole in the sprocket hubs. The centrally located hole is configured to receive the motor drive shaft or the sweep drive shaft. A pair of drive hubs each has an opening extending therethrough. Each of the openings in the drive hubs has a geometric shape comprising a non-round shape configured for engaging one of the motor or sweep drive shafts. Each of the drive hubs has an inner surface facing the second wall. The inner surfaces each have a plurality of pins thereon each is extendable into one of the slots such that each of the sprocket hubs is engaged by one of the drive hubs. A continuous belt is positioned on and engages the pair of sprocket hubs. Each of the slots has a length to allow limited rotation of the sprocket hubs with respect to the drive hubs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 12 thereof, a new drive shaft engagement device embodying the principles and concepts of an embodiment of the disclosure and generally designated by the reference numeral 12 will be described.

As best illustrated in FIGS. 1 through 12, the bin sweep and motor coupling assembly 10 generally comprises a drive engagement mechanism 12 facilitating quick, releasable engagement between a drive motor 14 and a bin sweep 16. More particularly, the assembly 10 may be utilized with a drive motor 14 which is configured to be removable from the bin sweep 16 housing and thereafter utilized with other, similar bin sweeps 16 to lower operation costs of grain bins. As such, the drive motor 14 may be mounted on a sled 18 that allows the drive motor 14 to be easily moved along the bin sweep 16. However, engaging a motor drive shaft 20 with a sweep drive shaft 22 is complicated by these shafts 20, 22 not being in proper rotational alignment with each other. In other words, each of these shafts 20, 22 will typically have a hexed end, or head 24, and if the hexed ends are not aligned properly with a structure receiving the hexed ends, they will have to be indexed until they can engage that structure. The term "indexed" used herein defines the ability to rotate one of a pair spaced engagement members such that it will align with a second of the pair of spaced engagement members. It should be understood that head 24 may have alternative constructions such as a splined end or a key. The gear mechanisms of the bin sweep 16, however, make such indexing very difficult and nearly impossible. The assembly 10 disclosed herein allows for the two shafts 20, 22 to be misaligned and still engage the assembly 10 to provide energy transfer from the motor drive shaft 20 to the sweep drive shaft 22. The motor 14, which may be an electric motor, and the bin sweep 16 are both conventional to grain bin sweeping assemblies.

Figure 5:
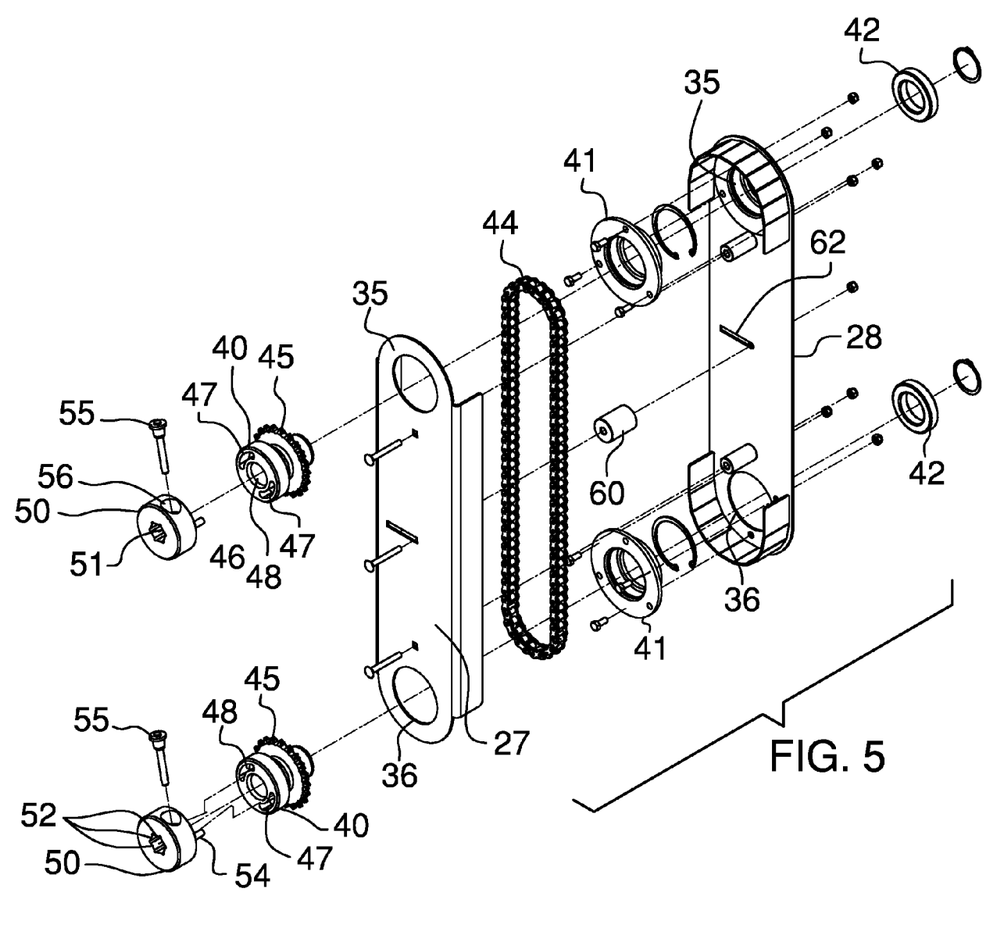
FIG. 5 is an exploded perspective view of an embodiment of the disclosure.
Figure 6:
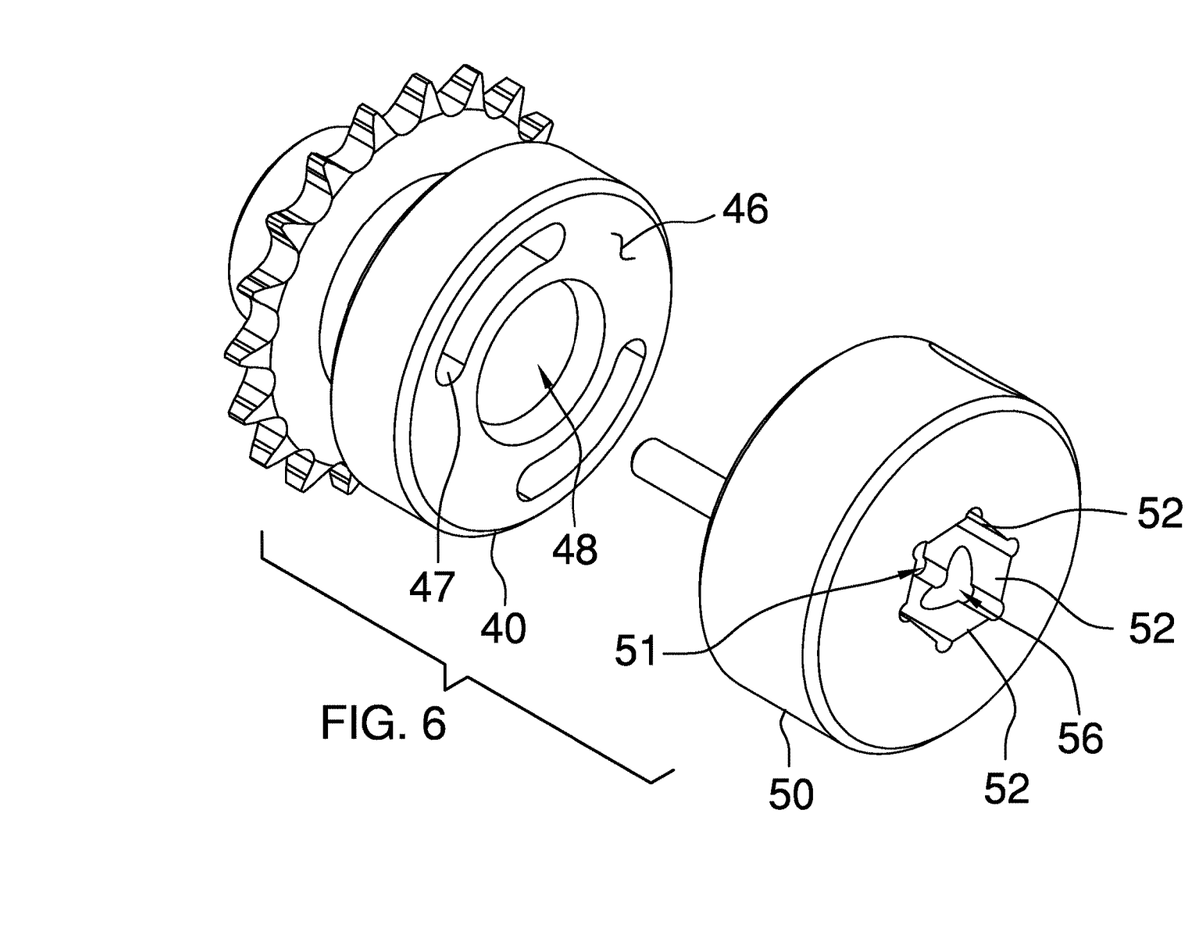
FIG. 6 is a perspective front view of a sprocket hub and drive hub of an embodiment of the disclosure.
Figure 7:
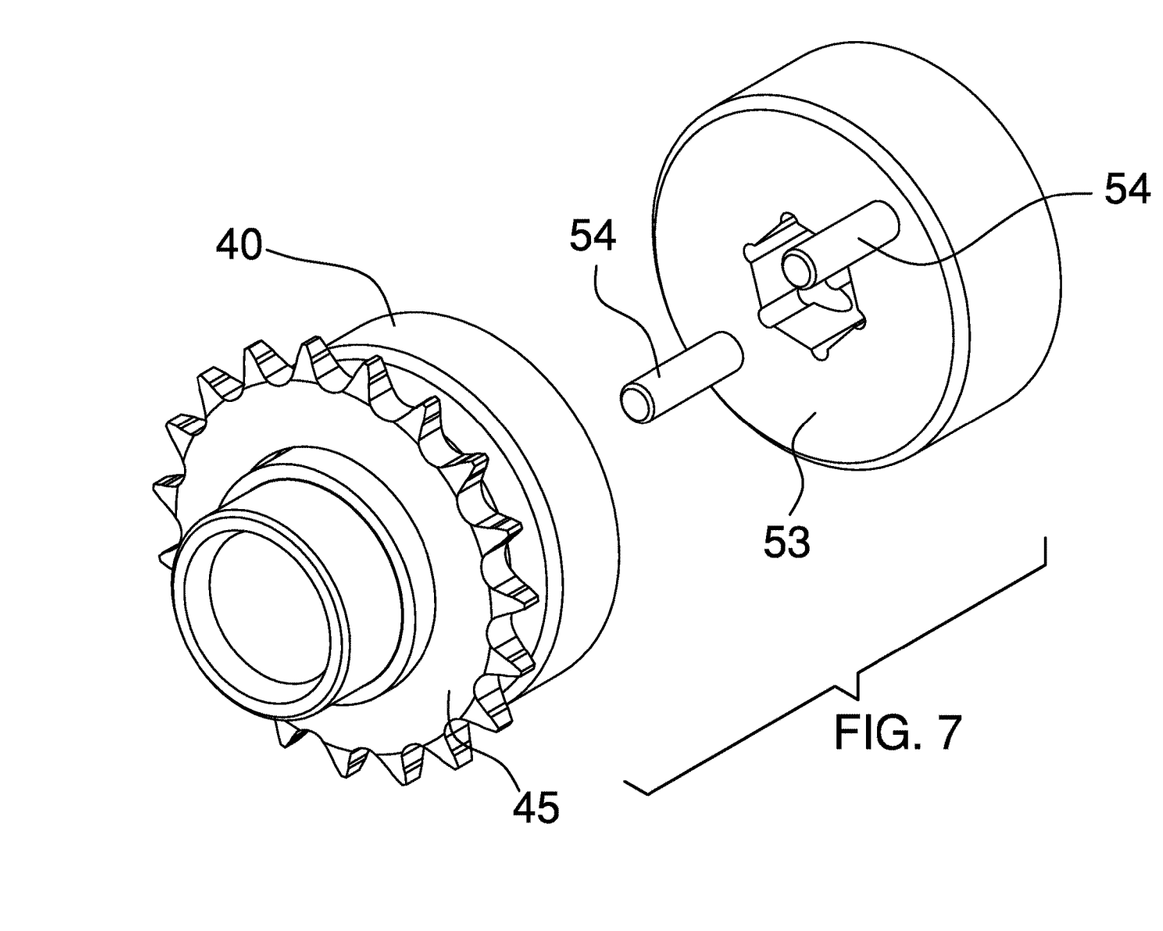
FIG. 7 is a perspective rear view of FIG. 6 of an embodiment of the disclosure.
Figure 8:
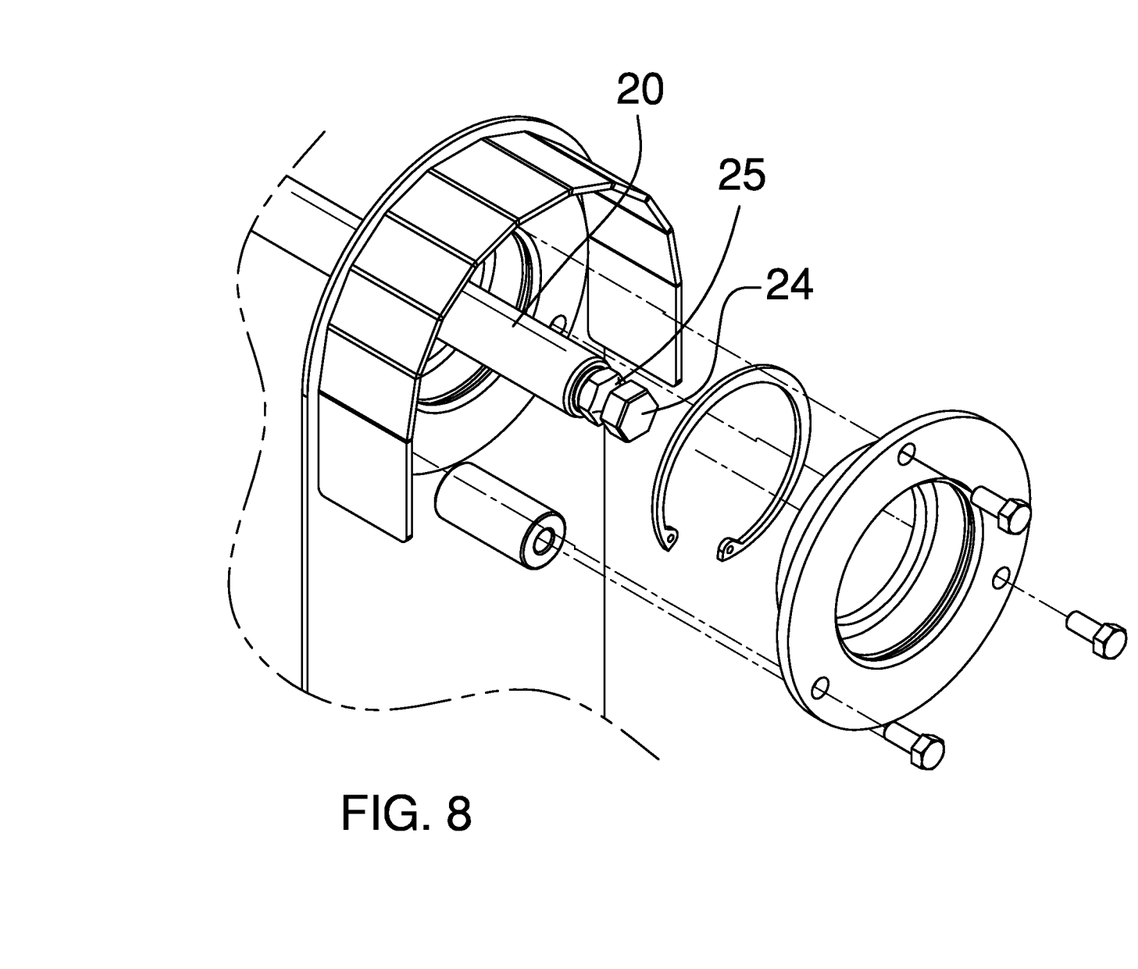
FIG. 8 is an exploded perspective view of a drive shaft positioning of an embodiment of the disclosure.
Figure 9:
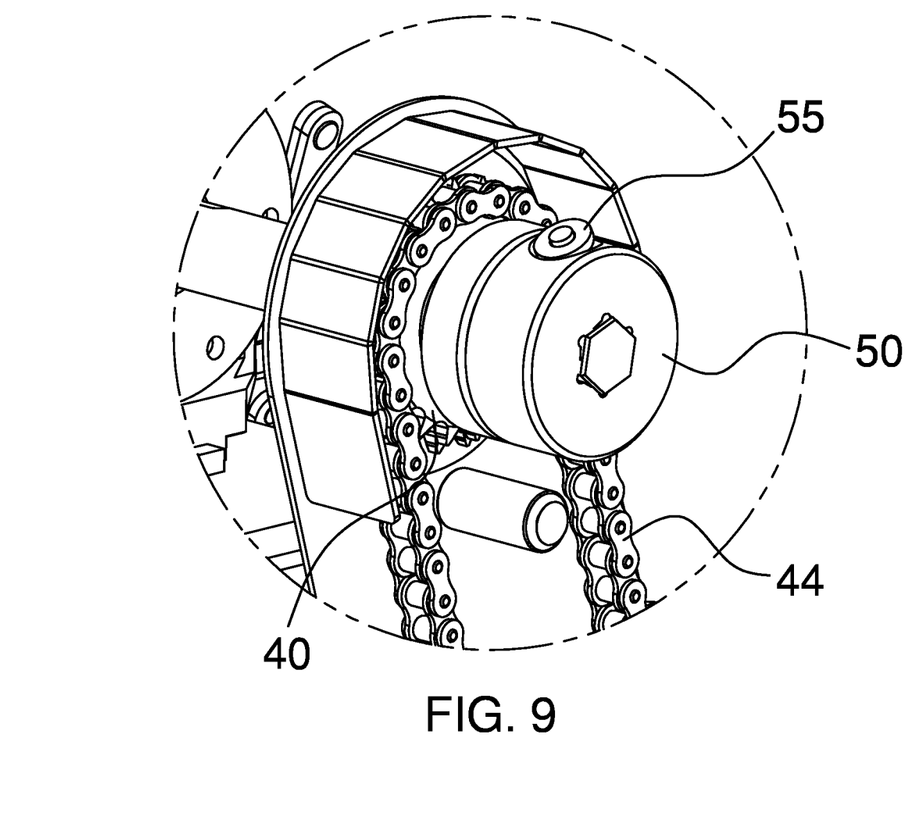
FIG. 9 is a front perspective view of an embodiment of the disclosure.
Figure 10:
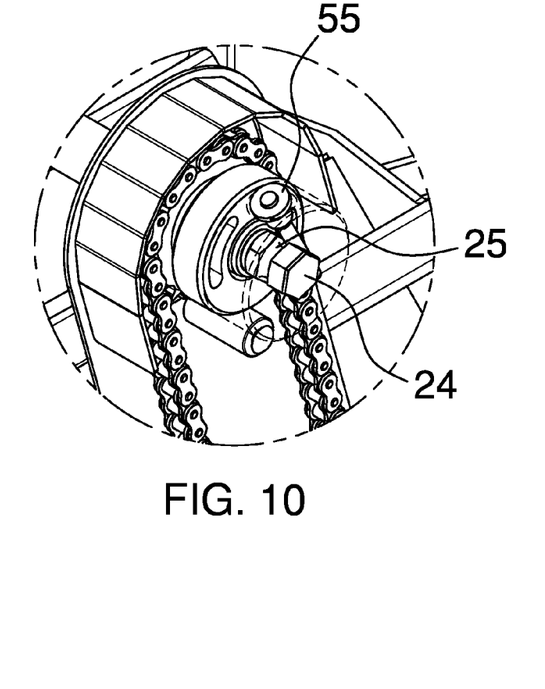
FIG. 10 is a front perspective view of an embodiment of the disclosure having portions thereof removed for clarity as to an engagement between a drive hub and a drive shaft.
Figure 11:
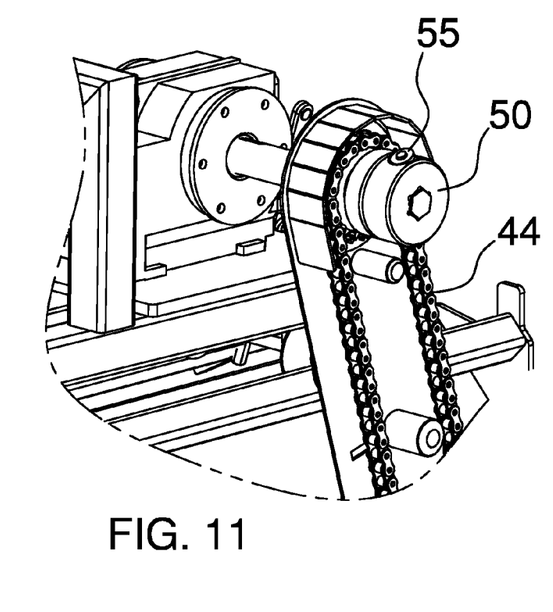
FIG. 11 is a front perspective view of an embodiment of the disclosure having a portion of a housing removed for clarity.
Figure 12:
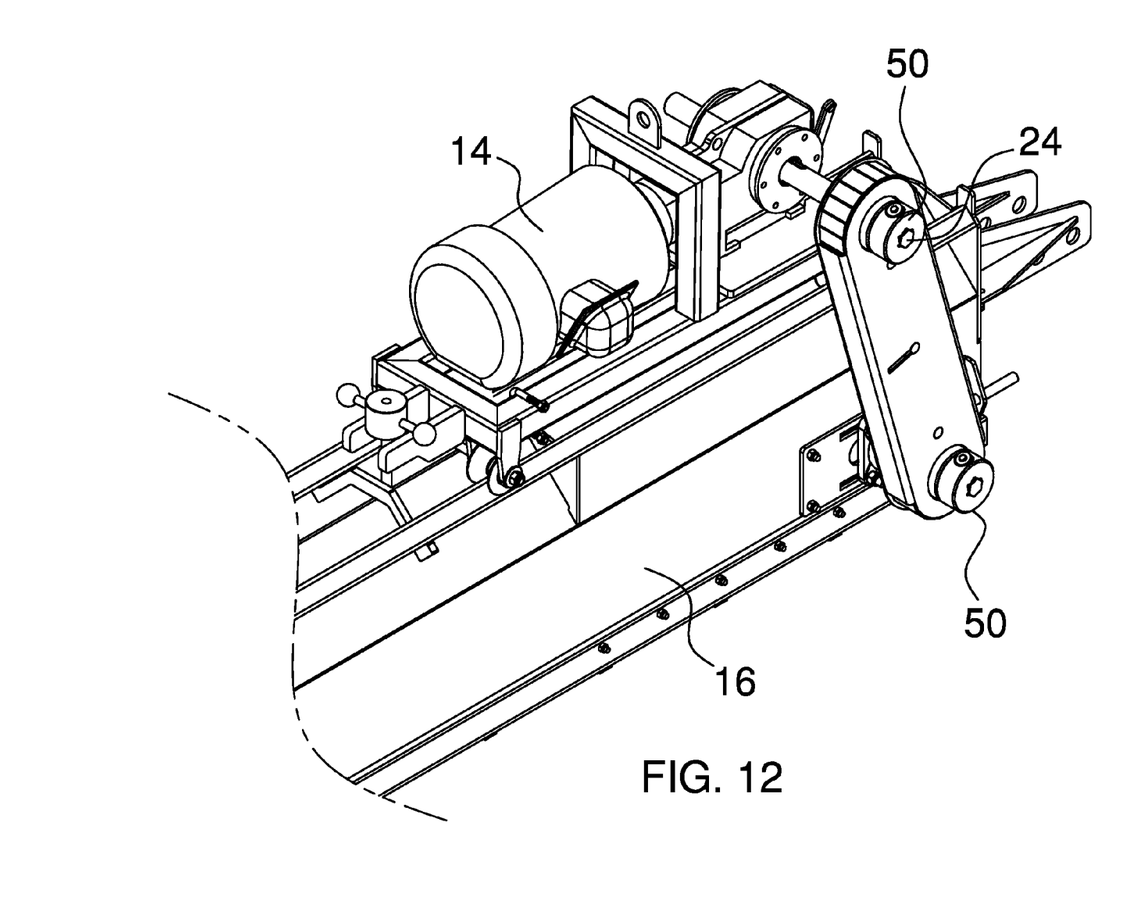
FIG. 12 is a front perspective view of an embodiment of the disclosure having a portion of the housing removed for clarity.

The assembly 10 includes a housing 26 having a first wall 27, a second wall 28 and a perimeter wall 29 that is attached to and extends between the first 27 and second 28 walls to define an interior space bounded by the first 27, second 28 and perimeter 29 walls. The housing 26 has a first end 31, a second end 32, a first lateral side 33 and a second lateral side 34. The housing 26 has a first aperture 35 therein extending through the first 27 and second 28 walls adjacent to the first end 31 and a second aperture 36 therein extending through the first 27 and second 28 walls adjacent to the second end 32. As will be understood from the Figures, the first 35 and second 36 apertures may only extend through the second wall 27. The first aperture 35 is configured for receiving the motor drive shaft 20 and the second aperture 36 is configured for receiving the sweep drive shaft 22. The housing 26 may be formed into two sections, each section including one of the first 27 and second 28 walls, held together by fasteners as shown in FIG. 5.

A pair of sprocket hubs 40 is each rotatably mounted in the housing 26. One of the sprocket hubs 40 is aligned with the first aperture 35 and another one of the sprocket hubs 40 is aligned the second aperture 36. The sprocket hubs 40 may extend into bearing holders 41 placed in the first 35 and second 36 apertures in the second wall 28. Bearings 42 may be positioned between the sprocket hubs 40 and the bearing holders 41 to facilitate rotation of the sprocket hubs 40 relative to the housing 26. A belt 44 is positioned in the housing 26 and extends around the sprocket hubs 40. The belt 44 is continuous and may comprise a chain engaging teeth 45 on the sprocket hubs 40. Each of the sprocket hubs 40 includes an outer face 46 facing away from the second wall 28, wherein the second wall 28 faces the bin sweep 16 when the housing 26 is engaged with the sweep drive shaft 22. The outer face 46 of each of the sprocket hubs 40 includes a plurality of slots 47 therein, though a single slot 47 may be utilized. Each of the slots 47 is arcuate along a circle extending around a centrally located hole 48 in the sprocket hubs 40. The centrally located hole 48 receives the motor drive shaft 20 or the sweep drive shaft 22, depending on the location of the sprocket hub 40.

A pair of drive hubs 50 is provided and each of the drive hubs 50 has an opening 51 extending therethrough. Each of the openings 51 in the drive hubs 50 has a geometric shape, comprising a plurality of planar surfaces 52, which corresponds to a head 24 of one of the motor drive shaft 20 or the sweep drive shaft 22 and therefore is configured for engaging the heads 24 of the drive shafts 20, 24. The geometric shape generally is comprised of the planar surfaces 52 each having a same size and being positioned such that all angles between adjacent planar surfaces 52 are equal. As such, the geometric shape will typically comprise a triangle, a square, a pentagon, a hexagon, an octagon, other non round shapes or the like. As stated above, splined and key ends may also be utilized. Each of the drive hubs 50 has an inner surface 53 facing the second wall 28. The inner surfaces 53 each have a plurality of pins 54 thereon which correspond to and are extendable into one of the slots 47 such that each of the sprocket hubs 40 is engaged by one of the drive hubs 50. The number of pins 54 may be one pin 54 and up to four pins 54, though at least two pins 54 may be preferred.

In order to allow freedom of the drive hubs 50 to slightly, but freely rotate with respect to the sprocket hubs 40 and therefore accommodate the drive shafts 20, 22 being rotationally misaligned with each other, each of the slots 47 is elongated. The length of the slots 47 is at least equal to $360°/x$ wherein x is the number of planar surfaces 52 in one of the openings 51. Thus, if the head 24 and the planar surfaces 52 form a hexagon, x is equal to six and length of the slot(s) 47 would be such to allow the drive hubs 50 to freely rotate independently of the sprocket hubs 40 at least 60°. This freedom of rotational movement, or indexing, will generally never be more than 10% greater than $360°/x$, or $1.1(360°/x)$. It should be understood that the freedom of movement may be less than 20° if the shafts 20, 22 have splined ends. In general, the freedom of movement is required to be greater than a single indexing of one of the drive shafts 20, 22 as the drive hubs 50 themselves will be indexed. For this reason, it should further be contemplated that only one of the drive hubs 50 needs to rotate with respect to its associated sprocket hub 40. However, utilizing a pair of drive hubs 50 each being rotatably engaged to a sprocket hub 40 will facilitate the expeditious mounting of the drive hubs 50 to the drive shafts 20, 22.

Figure 1:
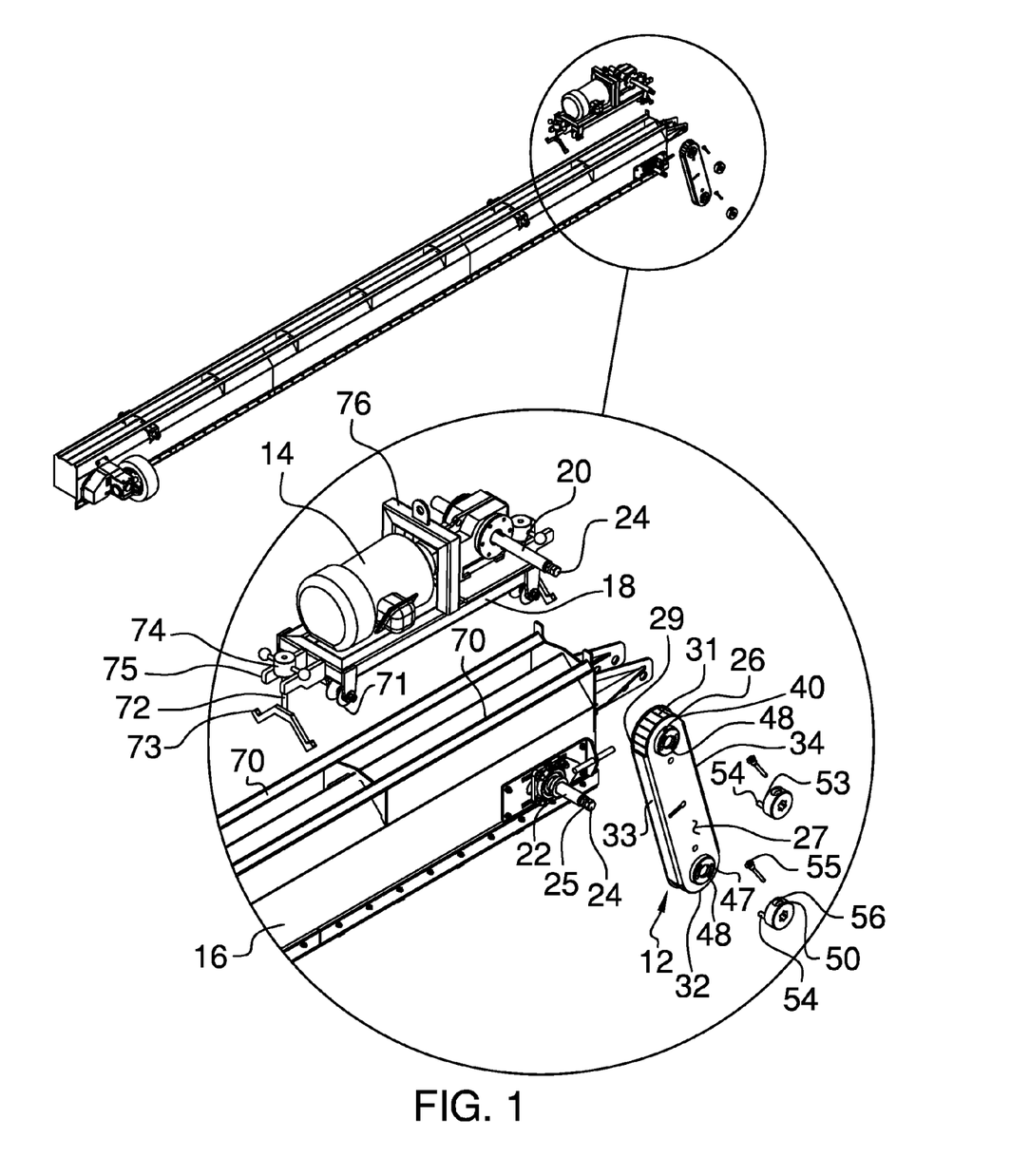
FIG. 1 is a perspective view of a bin sweep and motor coupling assembly according to an embodiment of the disclosure.
Figure 2:
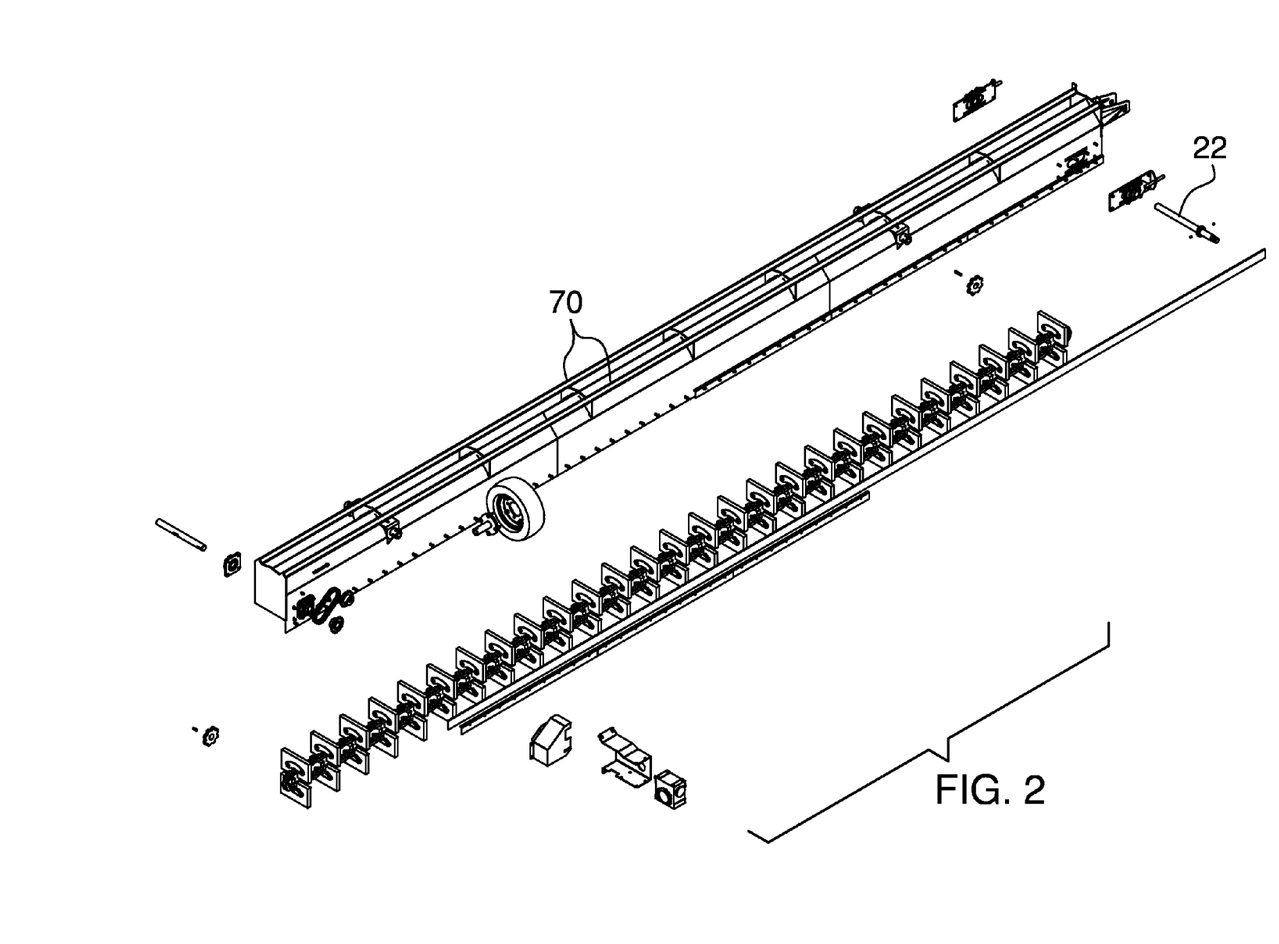
FIG. 2 is a perspective view of an embodiment of the disclosure.
Figure 3:
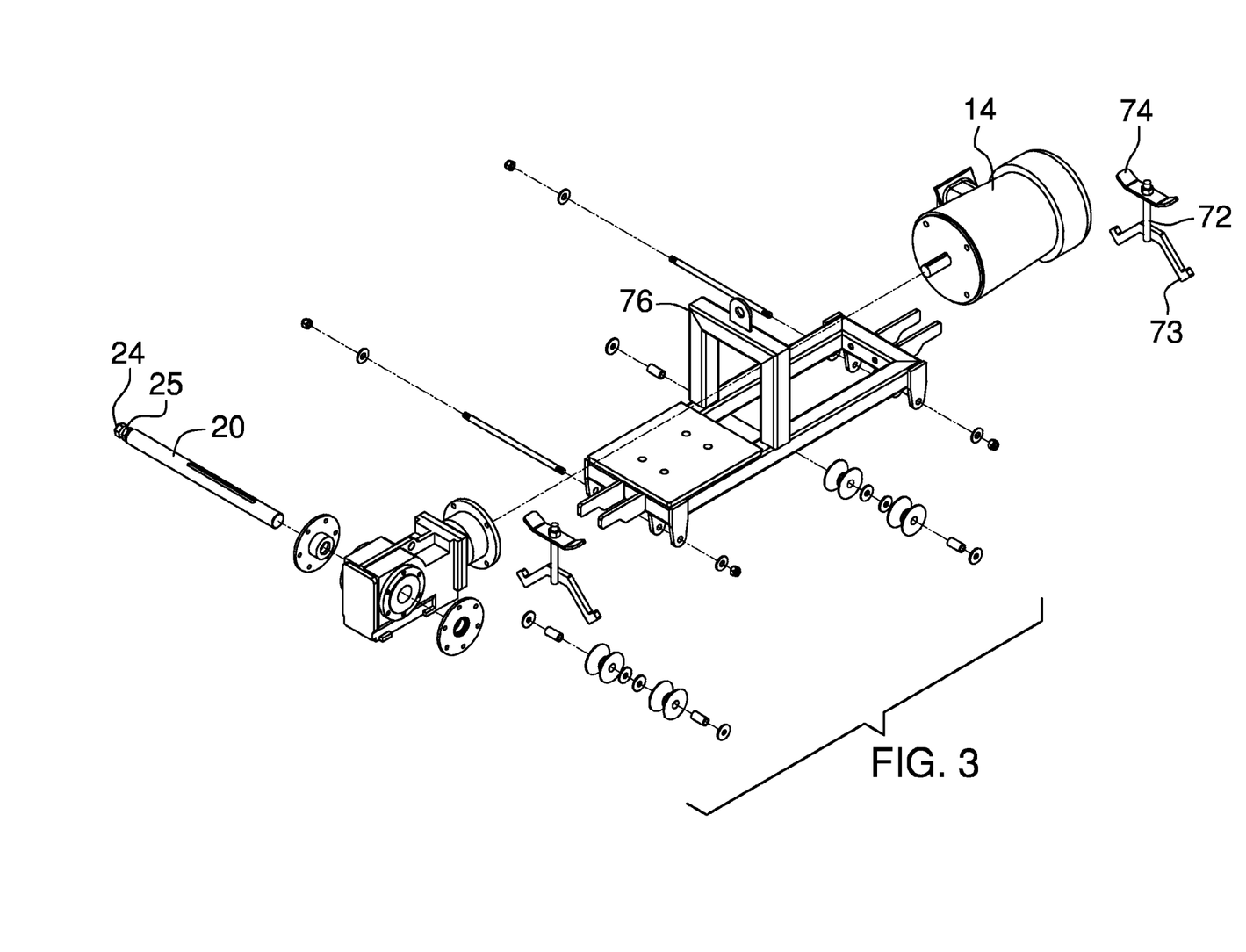
FIG. 3 is a perspective exploded view of a motor and sled of an embodiment of the disclosure.
Figure 4:
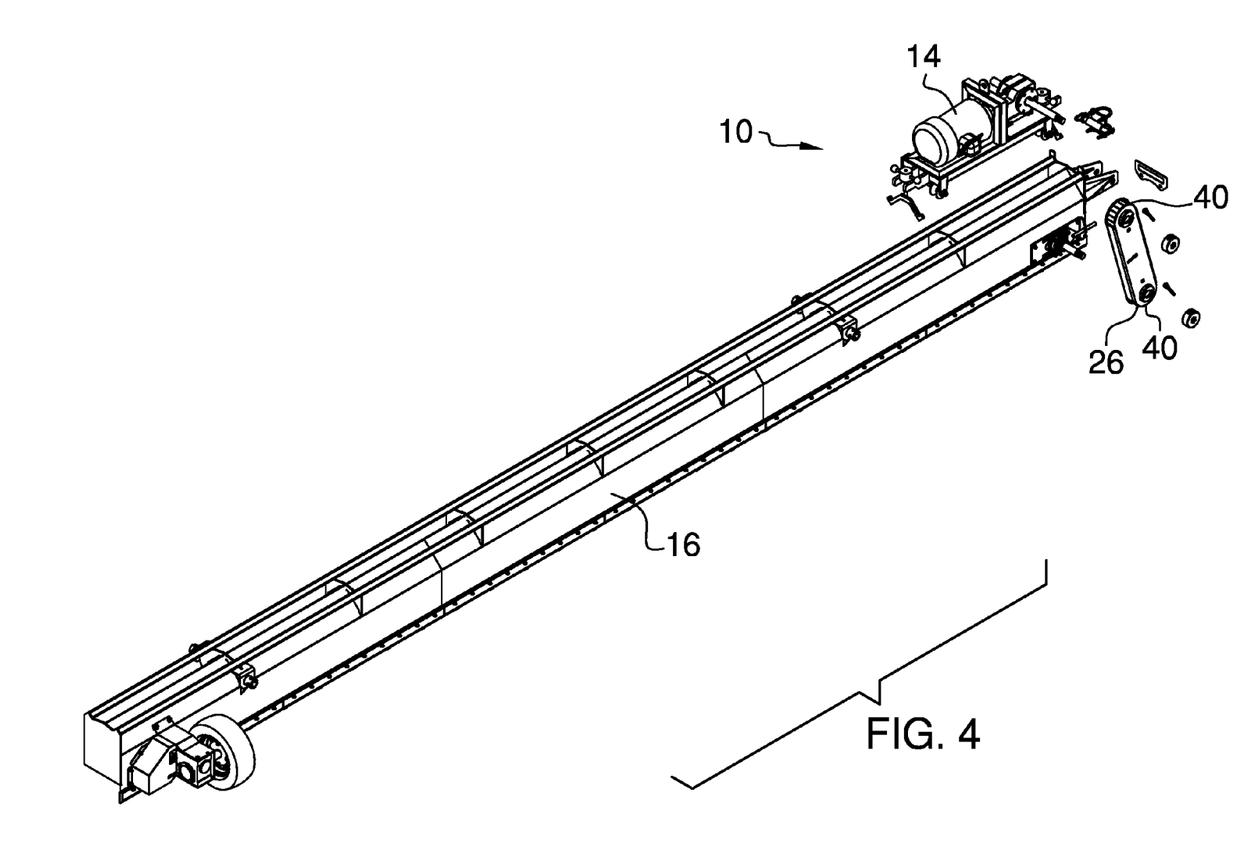
FIG. 4 is a perspective view of an embodiment of the disclosure.

FIGS. 1 and 5 depict more specifically the means for mounting the drive hubs 50 onto the motor 20 and sweep drive shafts 22. As can be seen in FIG. 1, the heads 24 each include a shape configured to engage the openings 51 in the drive hubs 50 after the heads 24 have passed through the holes 48 in the sprocket hubs 40. The drive hubs 50 may be rotated before being mounted on the heads 24 to ensure that the pins 54 properly align with corresponding slots 47. Once the drive hubs 50 are positioned on the heads 24 the drive hubs 50 may be secured in place with rods 55. Each of the drive hubs 50 has a bore 56 extending therein which is offset from an axis of the drive hubs 50 but which extends into the openings 51. The rod 55, when inserted into the openings 51, also extends into a channel 25 in the corresponding motor 20 or sweep 22 drive shaft adjacent to the head 24. Once the rod 55 is positioned in the channel 25, the drive hub 50 cannot be removed from its corresponding drive shaft 20, 22. As the channel 25 extends completely around its corresponding drive shaft 20, 22, the rod 55 allows freedom of rotation between the sprocket 40 and drive 50 hubs while preventing their disengagement from each other. This arrangement is particularly noticeable in FIG. 10.

As can be seen in FIG. 5, a chain tensioner 60 may be positioned within the housing 26 and abutted against the belt 44, or chain. The tensioner 60 may be movable within the housing 26 to selectively adjust the tension of the chain and to ensure that it remains taut with respect to the sprocket hubs 40. The tensioner 60 may be mounted on a fastener which extends through an elongated slit 62 in the housing 26 to allow its selectable positioning relative to the chain 44.

To facilitate removal of the motor 14 from the bin sweep 16, the motor 14, as previously stated may be mounted on a sled 18 which engages rails 70 mounted on the bin sweep 16. The rails 70 may comprise elongated tubes or shafts spaced from each other and oriented parallel to each other. The rails 70 are vertically positioned above a housing of the bin sweep 16 and the sled 18 includes a plurality of wheels 71 which are rolled upon the rails 70 during the movement of the sled 18 towards or away from the sweep drive shaft 22. Stops 72 may be provided which engage the rails 70 and the sled 18 to prevent movement of the sled 18 relative to the rails 70. More particularly, the stops 72 may include a lower section 73 which are abuttable against a lower surface of the rails 70 and an upper section 74 abuttable on an upper surface of the sled 18. The upper surface of the sled 18 may include a bracket 75 for receiving the stop 72. The upper 73 and lower 74 sections are movable towards each other to urge the upper surface, or bracket 75, towards the rails 70. This will prevent both lateral and vertical movement of the sled 18 relative to the rails 70. A saddle 76 is formed on the sled 18 for receiving the motor 14 and retaining the motor 14 in a static position relative to the sled 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A removable linkage assembly for coupling together a drive motor and a grain bin sweep, said assembly including:
    a housing having a first wall, a second wall and a perimeter wall being attached to and extending between said first and second walls to define an interior space bounded by said first, second and perimeter walls, said housing having a first end, a second end, a first lateral side and a second lateral side, said housing having a first aperture therein extending through said second wall adjacent to said first end and a second aperture therein extending through said second wall adjacent to said second end, wherein said first aperture is configured for receiving a motor drive shaft and said second aperture is configured for receiving a sweep drive shaft;
    a pair of sprocket hubs each being rotatably mounted in said housing, one of said sprocket hubs being aligned with said first aperture and another one of said sprocket hubs being aligned said second aperture, each of said sprocket hubs including an outer face facing away from said second wall, wherein said second wall faces a bin sweep when said housing is engaged with the sweep drive shaft, said outer face of each of said sprocket hubs including a plurality of slots therein, each of said slots being arcuate along a circle extending around a centrally located hole in said sprocket hubs, said centrally located hole being configured to receive the motor drive shaft or the sweep drive shaft;
    a pair of drive hubs each having an opening extending therethrough, each said opening in said drive hubs having a non-round shape configured for engaging one of said motor or sweep drive shafts, each of said drive hubs having an inner surface facing said second wall, each of said inner surfaces having at least one pin thereon being extendable into one of said slots such that each of said sprocket hubs is engaged by one of said drive hubs;
    a continuous belt being positioned on and engaging said pair of sprocket hubs; and
    wherein each of said slots has a length to allow limited rotation of said sprocket hubs with respect to said drive hubs.

2. The removable linkage assembly according to claim 1, wherein said housing is formed into two sections, each section including one of said first and said second walls.

3. The removable linkage assembly according to claim 1, further including a pair of bearing holders being positioned within said housing, each of said sprocket hubs extending into one of said bearing holders to facilitate rotation of said sprocket hubs relative to said housing.

4. The removable linkage assembly according to claim 1, wherein said belt comprises a chain engaging teeth on said sprocket hubs.

5. The removable linkage assembly according to claim 1, wherein said non-round shape comprises a triangle, a square, a pentagon, a hexagon or an octagon.

6. The removable linkage assembly according to claim 1, wherein at least one pin includes one pin and up to four pins.

7. The removable linkage assembly according to claim 1, wherein said length of said slots is at least equal to $360°/x$ wherein x is a number of planar surfaces in an associated one of said openings.

8. The removable linkage assembly according to claim 7, wherein said length of said slots is less than or equal to $1.1(360°/x)$.

9. The removable linkage assembly according to claim 1, wherein said non-round shape comprises a mating member configured to receive said motor or sweep drive shafts having a splined end.

10. The removable linkage assembly according to claim 9, wherein a freedom of movement of said sprocket hubs with respect to said drive hubs is less than $20°$.

11. The removable linkage assembly according to claim 1, further including a pair of rods, each of said drive hubs having a bore extending therethrough and being offset with an axis of a respective one of said drive hubs, said bore in each of said drive hubs releasably receiving one of said rods, said rods being configured to engage channels in said motor and said sweep drive shafts to retain said motor and said sweep drive shafts within said drive hubs.

12. The removable linkage assembly according to claim 1, further including a tensioner positioned within said housing and abutted against said belt, said tensioner being movable within said housing to selectively adjust a tension of said belt to facilitate tautness between said belt and said sprocket hubs.

13. The removable linkage assembly according to claim 12, wherein said tensioner is mounted on a fastener extending through an elongated slit in said housing, said fasteners being movable along said slot to allow selectable positioning of said fastener and said tensioner relative to said belt.

14. A bin sweep and removable linkage assembly for coupling together a drive motor and a grain bin sweep, said assembly including:
    a drive motor including a motor drive shaft;
    a bin sweep including a sweep drive shaft, said drive motor being mounted on a sled allowing said drive motor to be moved along said bin sweep, said sled being positioned on rails mounted on said bin sweep, said rails comprising a pair of elongated shafts oriented parallel to each other and extending generally along a length of said bin sweep, said rails being vertically positioned above said bin sweep, said sled including a plurality of wheels, said wheels being rolled upon said rails during movement of said sled towards or away from said sweep drive shaft;

a housing having a first wall, a second wall and a perimeter wall being attached to and extending between said first and second walls to define an interior space bounded by said first, second and perimeter walls, said housing having a first end, a second end, a first lateral side and a second lateral side, said housing having a first aperture therein extending through said second wall adjacent to said first end and a second aperture therein extending through said second wall adjacent to said second end, wherein said first aperture receives said motor drive shaft and said second aperture receives said a sweep drive shaft;

a pair of sprocket hubs each being rotatably mounted in said housing, one of said sprocket hubs being aligned with said first aperture and another one of said sprocket hubs being aligned said second aperture, each of said sprocket hubs including an outer face facing away from said second wall, wherein said second wall faces a bin sweep when said housing is engaged with the sweep drive shaft, said outer face of each of said sprocket hubs including a plurality of slots therein, each of said slots being arcuate along a circle extending around a centrally located hole in said sprocket hubs, said centrally located hole receives the motor drive shaft or the sweep drive shaft;

a pair of drive hubs each having an opening extending therethrough, each said opening in said drive hubs having a non-round shape for engaging one of said motor or sweep drive shafts, each of said drive hubs having an inner surface facing said second wall, each of said inner surfaces having at least one pin thereon being extendable into one of said slots such that each of said sprocket hubs is engaged by one of said drive hubs;

a continuous belt being positioned on and engaging said pair of sprocket hubs; and wherein each of said slots has a length to allow limited rotation of said sprocket hubs with respect to said drive hubs.

15. A bin sweep and removable linkage assembly according to claim 14, further including stops engaging said rails and said sled to selectively prevent movement of said sled relative to the rails.

16. A bin sweep and removable linkage assembly according to claim 14, further including a pair of bearing holders being positioned within said housing, each of said sprocket hubs extending into one of said bearing holders to facilitate rotation of said sprocket hubs relative to said housing.

17. A bin sweep and removable linkage assembly according to claim 14, wherein said length of said slots is at least equal to 360°/x wherein x is a number of planar surfaces in an associated one of said openings.

18. A bin sweep and removable linkage assembly according to claim 14, wherein said non-round shape comprises a mating member configured to receive said motor or sweep drive shafts having a splined end, a freedom of movement of said sprocket hubs with respect to said drive hubs being less than 20°.

19. A bin sweep and removable linkage assembly according to claim 14, further including a pair of rods, each of said drive hubs having a bore extending therethrough and being offset with an axis of a respective one of said drive hubs, said bore in each of said drive hubs releasably receiving one of said rods, said rods being configured to engage channels in said motor and said sweep drive shafts to retain said motor and said sweep drive shafts within said drive hubs.

* * * * *